Jan. 17, 1928.

G. R. GOULD 1,656,705

TANK GAUGE

Filed July 3, 1925

INVENTOR
George R. Gould.
BY
ATTORNEY

Patented Jan. 17, 1928.

1,656,705

UNITED STATES PATENT OFFICE.

GEORGE R. GOULD, OF KANSAS CITY, MISSOURI.

TANK GAUGE.

Application filed July 3, 1925. Serial No. 41,395.

This invention relates to tank gauges, the primary object being to provide an inexpensive, accurate measuring instrument to indicate the number of gallons of liquid, thereby eliminating the necessity of making mathematical calculations in order to determine how much liquid the tank contains. In other words, the gauge indicates the number of gallons of liquid in the tank and registers the actual contents in plain gallon figures. This is accomplished by providing a registering member having rotative and longitudinal movement with a spiral row of registering indicia on its periphery movable past a sight opening, the member being float actuated so that with the rise and fall of the liquid the indicia opposite the sight opening will indiate or register the exact number of gallons in the tank.

Figure 1:
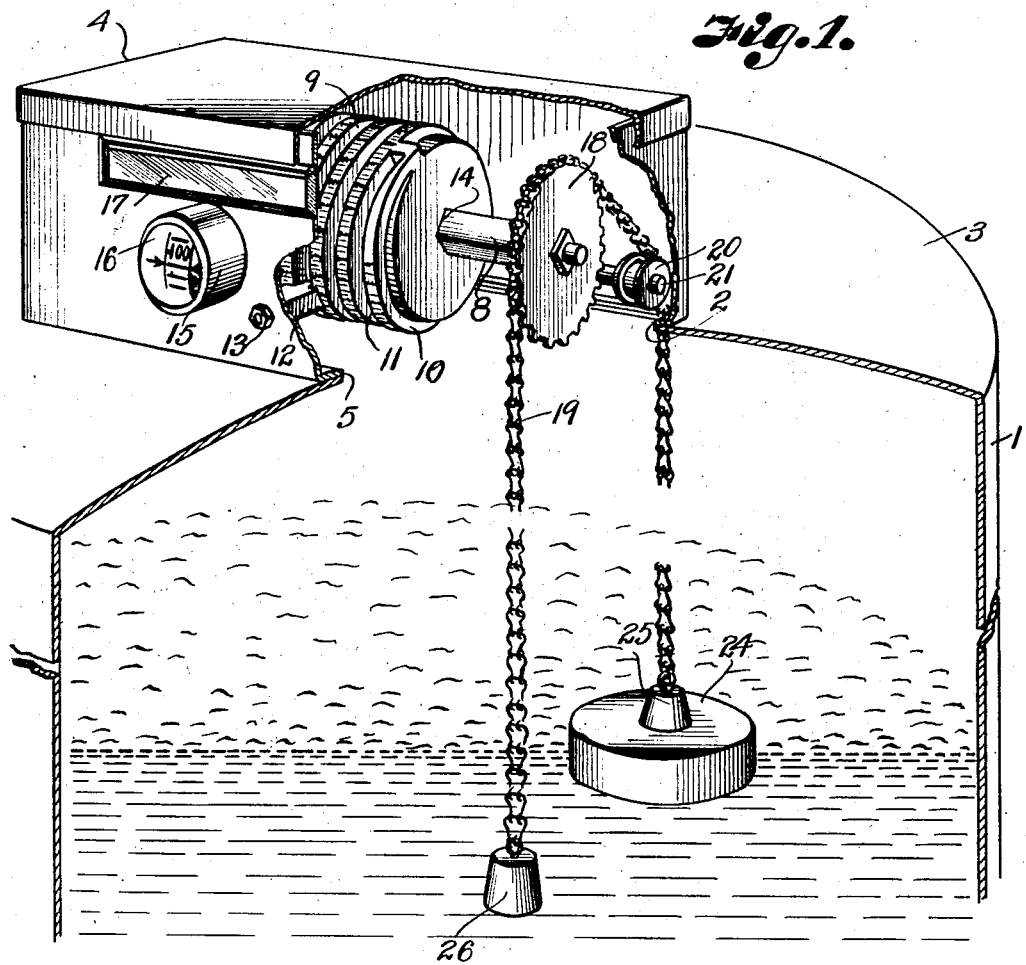
Figure 2:
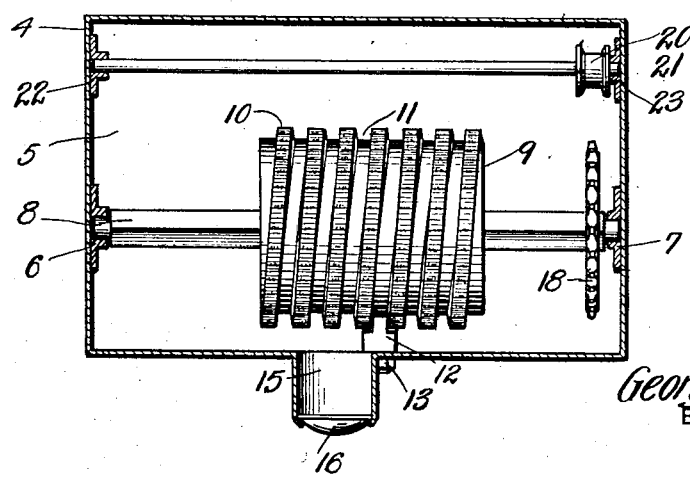

The construction of the preferred embodiment of my invention will be clearly understood by reference to the following description in connection with the accompanying drawings, in which Fig. 1 is a perspective view of a tank gauge constructed in accordance with my invention, part of the casing being broken away, and Fig. 2 is a longitudinal, horizontal, sectional view through the casing.

Referring now to the drawings by numerals of reference, 1 designates a liquid-containing tank having a top opening 2. Secured to the top 3 of the tank is a gauge casing 4 provided with an open bottom 5 registering with the opening 2. Rotatable in the bearings 6 and 7 of the casing 4 is a shaft 8 angular in cross section. It is shown as rectangular in cross section and upon the angular portion of the shaft is a registering or indicating member 9, illustrated as a drum on the periphery of which is a spiral flange 10 extending from end to end, the portion between the convolutes of the spiral flange constituting a groove 11 to be engaged by a rigid finger 12 fastened to the wall of the casing by the nut 13. Therefore, as the shaft 8 rotates, a rotative motion will be imparted to the drum, and since the drum has a polygonal or angular opening 14 which receives the shaft 8, it will be apparent that the drum must rotate with the shaft. Inasmuch as the drum is mounted for free longitudinal movement it will be obvious that when the drum is rotated the finger 12 will ride against the cam faces of the spiral convolutes so that the drum will be shifted longitudinally.

Upon the spiral flange are arranged certain indicia, in the present instance consisting of numbers indicating actual gallons. These are arranged in progressive sequence on the flange located opposite a sight opening 15 in the casing, the sight opening having a magnifying lens 16 therein spaced from the flange and drum a proper distance to provide the necessary focus for the lens. Therefore the operator may observe the relatively small numbers on the drum through the lens. 17 is a light-admitting window to provide the necessary illumination for the drum.

The drum is float actuated. I have shown the float actuated mechanism as including a flexible connection support indicated as a sprocket 18 on shaft 8, around which a flexible connection shown as a chain 19 passes. The chain also passes over an idler 20 on the shaft 21 in bearings 22 and 23 in the casing 4. On one end of the flexible connection or chain 19 is a float 24 provided with a weight 25, the float preferably being hollow and preferably of metal. The particular construction of the float, however, may be varied. At the opposite end of the flexible connection 19 is a counter balance weight 26 to maintain the chain taut at all times. The indicia on the drum are calculated to indicate the number of gallons in the tank for any level, the float-actuated mechanism being the connecting link between the level of the liquid and the drum. Therefore, the drum will be rotated by the rise and fall of the liquid in the tank. The slack will be at all times taken out of the chain by the weights 25 and 26 so that a practically true reading may be had through the sight opening.

It will be apparent that the drum may move to and fro longitudinally of the shaft 8 dependent upon the direction of rotation of the shaft because the finger 12 will at all times be in the groove 11.

From the foregoing it will be apparent that the device is simple in construction, rugged and inexpensive to manufacture, that it may easily be installed upon a conventional form of tank without materially altering the tank. I have shown the device on top of the tank, but obviously it may be arranged on the side of the tank at the proper height if this is found to be expedient.

What I claim and desire to secure by Letters-Patent is:

1. In a device of the class described, the combination of a rotatable shaft of angular cross section, a drum having angular end openings through which the shaft is projected to slidably mount the drum on the shaft and having a spiral groove in its periphery, a stationary member frictionally engaging the drum within the groove for effecting movement of the drum along the shaft when the shaft is rotated, the drum having indicia on its periphery, and fixed means for exposure of said indicia.

2. In a device of the class described, the combination of a rotatable shaft, a drum keyed to the shaft for rotation therewith and movement longitudinally thereon, the drum having a spiral groove in its periphery, a stationary member frictionally engaging the drum within the groove, an indicator fixed adjacent the drum, and indicia provided on the drum for indentification by said indicator upon movement of the drum.

3. In a device of the class described, the combination of a rotatable shaft, a drum keyed to the shaft for rotation therewith and movement longitudinally thereon, the drum having a spiral groove in its periphery, a stationary member frictionally engaging the drum within the groove, indicia on the drum between the convolutions of the groove, an indicator supported adjacent the drum to point out indicia brought adjacent thereto by the movement of the drum, and means for rotating the shaft.

In testimony whereof I affix my signature.

GEORGE R. GOULD.